Dec. 29, 1931.  W. KANNENBERG  1,839,035
HOOD LOCK FOR AUTOMOBILES
Filed May 7, 1930
Fig. 1.
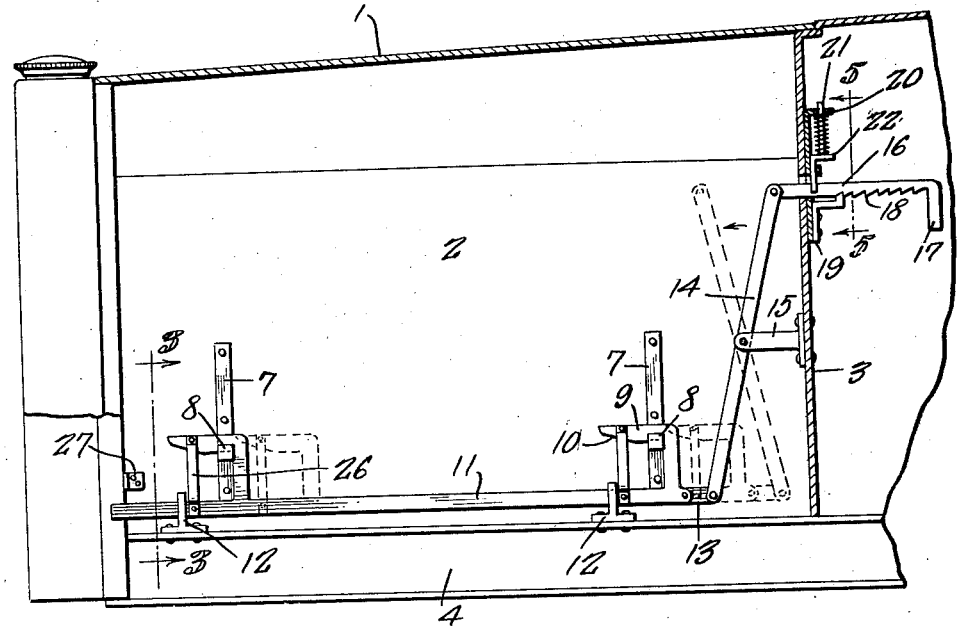
Fig. 2.
Fig. 3.
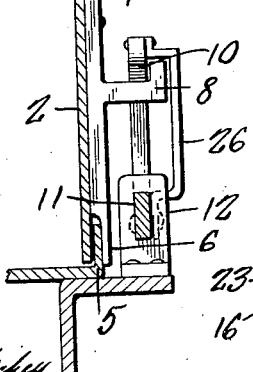
Fig. 4.
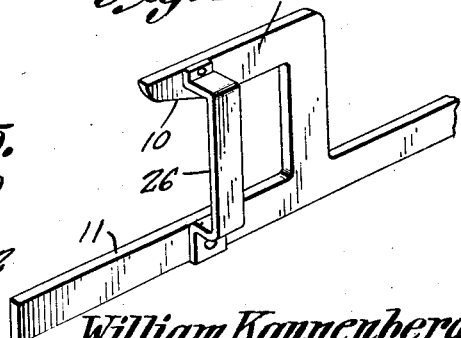
Fig. 5.
William Kannenberg,
INVENTOR
BY Victor J. Evans
ATTORNEY Patented Dec. 29, 1931

1,839,035

UNITED STATES PATENT OFFICE

WILLIAM KANNENBERG, OF MILWAUKEE, WISCONSIN

HOOD LOCK FOR AUTOMOBILES

Application filed May 7, 1930. Serial No. 450,527.

My present invention has reference to a latching or locking means which is primarily designed for use for holding the hinged sides of the hood of an automobile in closed and locked position but to prevent such sides from vibrating or movement in any direction.

A further object is the provision of a latching means for this purpose which is operable from the interior of the automobile.

A still further object is the provision of a means for this purpose which can be readily and quickly attached to the frame of an automobile, and the hinged sides of the hood thereof in an easy and expeditious manner and wherein the device is of a simple construction that may be cheaply manufactured, operated only from the interior of the vehicle and held from accidental movement in either a locking or unlocking position.

To the attainment of the foregoing the invention consists in the improvement hereinafter described and definitely claimed.

In the drawings:

Figure 1 is a sectional view through a sufficient portion of the front of an automobile to illustrate the application of my improvement thereon.

Figure 2 is a horizontal sectional view therethrough.

Figure 3 is a vertical sectional view approximately on the line 3—3 of Figure 1.

Figure 4 is a perspective view of a portion of the slidable bar showing the arrangement of one of the latch hooks thereon.

Figure 5 is a sectional view approximately on the line 5—5 of Figure 1.

While my improvement is admirably adapted for locking the hinged sides of a hood to the frame or body of an automobile and will be hereinafter described in connection therewith I desire to state that the same is not to be thus limited in its useful capacity as the same may be successfully employed in other connections.

In Figure 1 of the drawings I have illustrated the front portion of an automobile or like motor propelled vehicle. The hood is indicated by the numeral 1, one of the hinged sides of the hood by the numeral 2, the front or dash board of the automobile by the numeral 3 and one of the side channeled frame members by the numeral 4.

In the drawings I have illustrated my improvement connected for locking or latching only one of the hinged sides of the hood to the frame of the automobile but obviously two of such devices are to be employed and the same can be operated either simultaneously or independently as desired.

The frame 4 has fixed on its upper flange a preferably longitudinally extending angle plate 5, and this angle plate is designed to be engaged by the reduced or lipped ends 6 of vertical plates 7 which are riveted or otherwise fixed on the inner faces of the hinged sides 2 of the hood, when the side 2 is closed. Any desired number of the plates 7 may be employed, two being disclosed by the drawings, and each of the plates is formed with a substantially L-shaped offset portion 8 that affords both a track and a keeper for the latching hooks 9 that are slidable thereover. The latching hooks are of substantially rectangular formation but have their forward ends on their under faces beveled or inclined, as at 10. The hooks are integrally formed upon a slide bar 11 and the bar is arranged for movement through guides 12 that are riveted or otherwise fixed on the frame member 4.

The rear end of each of the slide bars 11 has pivotally connected thereto a short link 13 and the outer end of each of the short links is connected to arms 14. The pivotal connection between the arms 14 and the short links 13 may be in the nature of elongated members and may extend transversely at the rear of the engine which is enclosed by the hood so that both of the slide bars may be simultaneously operated. The arm 14 is centrally pivoted to a bracket 15 which is fixed to and extends outwardly from the dash 3. The arm 14 is, of course, upwardly directed and has pivoted to its said upper end an operating element 16. The element passes through a suitable opening in the latch and has its outer end formed with a down-turned grip 17. The under face of the substantially rectangular plate or element 16 is formed with spaced saw teeth 18 and these teeth are designed to be engaged by a detent or by the angle upturned end of a bracket member 19 that is fixed on the inner face of the dash 3. Also fixed on the inner face of the dash 3 above the handle 16 there is a guide 20 for a spring influenced bolt or plunger rod 21, the said rod carrying at its outer end an angle plate 22. The depending and vertical flange of the angle plate is guided through a substantially U-shaped slot 23 and preferably and as best disclosed by Figure 5 of the drawings the guide, plunger and detent are carried by a metal plate 25 which is fixed on the said inner face of the dash 3 and which has its lower end provided with a slot through which the element 16 passes. The slot is formed by slitting the plate 25 from the lower end thereof and bending the metal outwardly to provide what I have termed the detent carrying bracket 19.

In order to reinforce the latching hooks on the slide bar 11 there is secured between these elements the angle ends of brace plates 26. On the sides 2 of the hood there are brackets 27 to contact with the inner face of the radiator frame and hold the hood from longitudinal movement. While the brace plates 26 are not shown integrally formed with the hooks and with the slide bar 11, the said members 26 may, if desired, be integrally formed with the said hooks and bar, in which instance, the central portion of the brace plate 26 is offset inwardly from the said hooks and bar so that the said brace will not interfere with the sliding of the hook onto or off of the keeper 8.

It will be apparent that with my improvement the hinged sides 2 of the hood cannot be opened except from the interior of the car. In operation it is necessary to raise the handle 16 against the pressure of the spring influenced guard to bring the teeth 18 thereof out of engagement with the tooth or detent on the element 19 and thereby to impart an outward swinging to the arm, that is, a longitudinal movement in the direction of the front of the automobile. This will cause the bar 11 to move longitudinally toward the dash 3 and to draw the latch hooks 9 off of the angle keepers 8 which, of course, will permit the side 2 being raised. When the sides 2 are lowered the lips 6 on the bracket plate 7 will, as previously stated, engage the plates or flanges 5, so that the sides 2 will be held temporarily closed. The driver after entering the car will move the element 16 in an opposite direction to impart an opposite sliding movement to the bar and, of course, to the latch hooks so that the latch hooks will again be brought over the angle keepers 8 and the side members 2 effectively locked in closed position. The keeper carrying plates 7, being riveted to the hinged sides 2 of the hood, materially reinforce the said sides.

Having described the invention, I claim:

1. A latching means for the hinged sides of an automobile hood on the frame of an automobile, comprising plates fixed to the hinged sides and having offset substantially L-shaped portions affording keepers, guides on the frame of the automobile, a slide bar movable through the guides, said slide bar having upwardly directed substantially rectangular portions whose longitudinal parts have their lower corners tapered, to afford hooks and whose vertical elements, adjacent said hooks, have their central portions offset therefrom, a link pivotally connected to the inner end of the slide bar, a centrally pivoted arm connected to the link, an operating element having a handle arranged on the interior of the automobile, movable to impart a longitudinal movement to the slide and a like movement to the hooks to bring the same into or out of engagement with the L-shaped keepers on the plates.

2. The combination with a slidable hook carrying bar guided on the frame of an automobile and designed to engage keepers on the hood for the automobile, of operating means for said slide, comprising a centrally pivoted arm, a link connection between the arm and the slide, an element pivotally secured to the upper end of the arm, a slotted fixed bracket through which the element is passed, said element having its under face provided with saw teeth and its outer end formed with a handle, a detent on the bracket to engage with the saw teeth, and a downwardly movable spring influenced centrally notched plate to receive the upper and non-toothed edge of the element therein, to force the teeth of the said element into engagement with the detent, and whereby the element must be swung upwardly to permit of the longitudinal movement thereof in the swinging of the arm.

In testimony whereof I affix my signature.

WILLIAM KANNENBERG.